United States Patent
Ghafarianzadeh et al.

(10) Patent No.: US 10,176,388 B1
(45) Date of Patent: Jan. 8, 2019

(54) SPATIAL AND TEMPORAL INFORMATION FOR SEMANTIC SEGMENTATION

(71) Applicant: Zoox, Inc., Menlo Park, CA (US)

(72) Inventors: Mahsa Ghafarianzadeh, Emerald Hills, CA (US); James William Vaisey Philbin, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 100 days.

(21) Appl. No.: 15/409,841

(22) Filed: Jan. 19, 2017

Related U.S. Application Data

(60) Provisional application No. 62/422,009, filed on Nov. 14, 2016.

(51) Int. Cl.
*G06K 9/00* (2006.01)
*G06T 7/174* (2017.01)

(52) U.S. Cl.
CPC ..... *G06K 9/00805* (2013.01); *G06K 9/00671* (2013.01); *G06K 9/00973* (2013.01); *G06T 7/174* (2017.01); *G06T 2207/20081* (2013.01); *G06T 2207/20084* (2013.01); *G06T 2207/30241* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 9,760,806 B1 * | 9/2017 | Ning | ..................... | B60W 50/14 |
| 10,013,640 B1 * | 7/2018 | Angelova | .......... | G06K 9/00624 |
| 2012/0288186 A1 * | 11/2012 | Kohli | ................... | G06K 9/6255 |
| | | | | 382/159 |
| 2015/0227805 A1 * | 8/2015 | Stokman | .............. | H04N 5/2621 |
| | | | | 382/286 |
| 2017/0193338 A1 * | 7/2017 | Huberman | ........... | G05D 1/0088 |
| 2017/0255832 A1 * | 9/2017 | Jones | ................. | G06K 9/00771 |
| 2017/0293804 A1 * | 10/2017 | Min | ................... | G06K 9/00744 |

(Continued)

OTHER PUBLICATIONS

C. Chen, "Extracting cognition out of images for the purpose of autonomous driving," Ph.D. dissertation, Princeton University, 2016. (Year: 2016).*

(Continued)

*Primary Examiner* — Justin P. Misleh
(74) *Attorney, Agent, or Firm* — Lee & Hayes, P.C.

(57) ABSTRACT

Systems and methods for segmenting an image using a convolutional neural network are described herein. A convolutional neural network (CNN) comprises an encoder-decoder architecture, and may comprise one or more Long Short Term Memory (LSTM) layers between the encoder and decoder layers. The LSTM layers provide temporal information in addition to the spatial information of the encoder-decoder layers. A subset of a sequence of images is input into the encoder layer of the CNN and a corresponding sequence of segmented images is output from the decoder layer. In some embodiments, the one or more LSTM layers may be combined in such a way that the CNN is predictive, providing predicted output of segmented images. Though the CNN provides multiple outputs, the CNN may be trained from single images or by generation of noisy ground truth datasets. Segmenting may be performed for object segmentation or free space segmentation.

21 Claims, 8 Drawing Sheets

(56) References Cited

U.S. PATENT DOCUMENTS

2017/0372475 A1* 12/2017 Gulsun .................. G06N 3/02
2018/0082443 A1* 3/2018 Risman ................. G06T 9/002
2018/0114071 A1* 4/2018 Wang ................ G06K 9/00765

OTHER PUBLICATIONS

Donahue, J., Hendricks, L.A., Rohrbach, M., et al.: 'Long-term recurrent convolutional networks for visual recognition and description', IEEE Trans. Pattern Anal. Mach. Intell., 2017, 39, (4), pp. 677-691 (Year: 2017).*
Sainath et al., "Convolutional, long short-term memory, fully connected deep neural networks," in IEEE International Conference on Acoustics, Speech, and Signal Processing (ICASSP), pp. 4580-4584, Apr. 2015. (Year: 2015).*
J. Chen, L. Yang, Y. Zhang, M. S. Alber, and D. Z. Chen. Combining fully convolutional and recurrent neural networks for 3d biomedical image segmentation. In NIPS, pp. 3036-3044, 2016. (Year: 2016).*
X. Li, M. Ye, D. Liu, F. Zhang, and S. Tang, "Memory-based object detection in surveillance scenes," in ICME, 2016. (Year: 2016).*
S. K. Mustikovela, M. Y. Yang, and C. Rother. Can ground truth label propagation from video help semantic segmentation? ECCV Workshop on Video Segmentation, 2016. (Year: 2016).*
Ghafarianzadeh et al., "Unsupervised Spatio-Temporal Segmentation with Sparse Spectral Clustering", British Machine Vision Conf, Sep. 2014, 11 pgs.

* cited by examiner

SPATIAL AND TEMPORAL INFORMATION FOR SEMANTIC SEGMENTATION

CROSS REFERENCE TO RELATED APPLICATIONS

This patent application claims priority from U.S. Provisional Patent Application No. 62/422,009, filed Nov. 14, 2016, which is hereby incorporated by reference, in its entirety.

BACKGROUND

Image segmentation is often used as a method for partitioning an image into different segments, or super-pixels, to provide a more meaningful representation of the image. As one example, an image may be segmented so as to uniquely identify objects within the image.

Image segmentation can be used in a number of different applications. Considering an image of a scene in an environment, a segmented image associated with the scene may contain a representation of every object located in the environment. The presence and/or locations of the objects contained in the segmented image may, in turn, be used for obstacle avoidance, object detection and tracking, or the like in systems using some aspects of machine vision.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
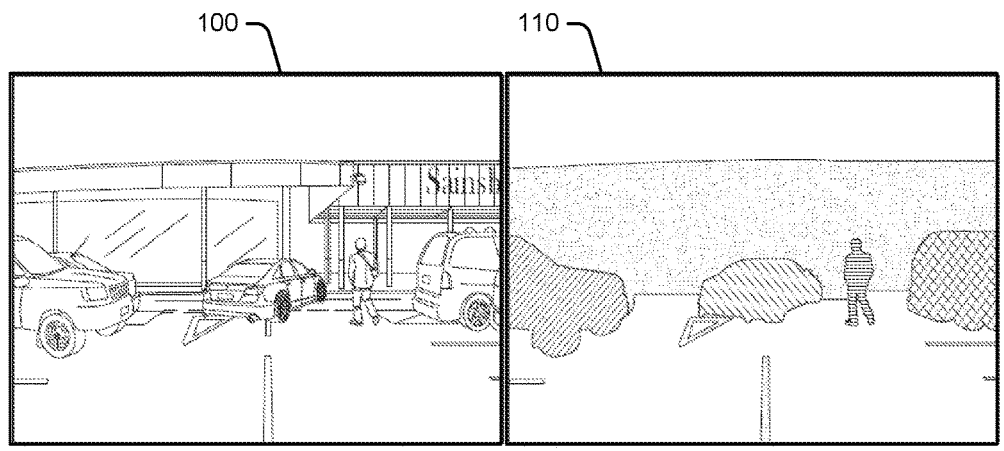
FIGS. 1A and 1B illustrate exemplary image segmentation to produce images segmented for objects and for free space, respectively.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The following detailed description is directed to systems, devices, and techniques for segmenting a subset of images from a sequence of images using temporal information. As discussed herein, image segmentation can be used to provide a representation which is more meaningful than image data alone. For example, segmented images acquired from an image capture device onboard an autonomous vehicle can be used to inform the autonomous vehicle of the presence and/or locations of objects, such as other vehicles, pedestrians, and roads, in an environment. In turn, this information can be used to generate trajectories and control the vehicle so as to avoid those obstacles, stay on a given path, or so on.

Though there are methods which segment an image algorithmically, those methods may not be fast or robust to different inputs. To overcome these limitations, in some embodiments, machine learning is used to predict a segmented image from an input image. Machine learning generally refers to a broad class of such algorithms in which an output is generated based on learned parameters, which will be discussed in detail below. In some embodiments, an example machine learning algorithm which can be used to generate the segmented image is a convolutional neural network, or CNN. CNNs are biologically inspired algorithms which pass input data through a series of connected layers to produce an output. Each layer in a CNN may comprise any number of layers, and may also comprise another CNN. The manner in which the various layers of a CNN are connected to one another is generally referred to as an architecture of the CNN. The architecture for a CNN which produces segmented images will be discussed in detail below.

The improved architecture for a convolutional neural network, as described herein, improves a functioning of a computing device by reducing processing time and/or increasing an accuracy of results in a machine learning context. For example, a CNN can incorporate one or more long short term memory (LSTM) layers to associate temporal information with spatial information associated with a dataset, thereby improving processing time and/or an accuracy of object identification. In another example, incorporating one or more LSTM layers into the CNN provides more accurate predictions of future events, such as predictions of object motion. Further, smaller datasets can be utilized for training a CNN by generating "noisy" datasets by propagating labels from an oversegmented ground truth image to one or more unlabeled images, for example, which reduces an initial amount of data and processing for training. Further, by generating a larger noisy dataset from a smaller initial dataset, an accuracy of the CNN can be increased for semantic segmentation. These and other improvements to the functioning of the computer are discussed herein.

Exemplary Convolutional Neural Network (CNN) Architecture

In general, CNNs comprise multiple layers. Depending on the problem to be solved, differing layers and connections between layers can be used. The architecture of the CNN refers to which layers are used and how they are connected. As will be discussed in detail below, a CNN which has been trained can form the basis of another CNN. In any embodiment, the layers in the architecture can be selected based on the training dataset used, the complexity of the objects, and the like.

Each layer in a CNN architecture creates some association of information. Here, segmentation of images is performed through the use of both spatial layers, as well as temporal layers. These spatial layers provide spatial information of an image, for example comparison of pixel values of neighboring pixels, whether intensities, Red-Green-Blue (RGB), or the like. One such example of a spatial layer is an encoder architecture. Such an encoder architecture may comprise a previously trained CNN, such as, for example, a Visual Geometry Group (VGG) CNN. Inversely, a decoder layer may perform the inverse operation of an encoder layer, providing an image as output from spatial information provided.

An example CNN which can be used to segment an image may be referred to as an encoder-decoder architecture. As will be discussed in detail below, such a CNN comprises an encoder layer which is in turn connected to a decoder layer. In some embodiments, a chronologically ordered subset of a sequence of images is input into the encoder layer and corresponding segmented images are output from a decoder layer. In some instances, a subset may include some or all of a sequence of images.

In some instances, the CNN described herein can perform semantic segmentation to segment images and provide classification and/or identification of objects associated with the segmented portions of the image.

In some instances, the CNN may use convolutional layers that filter at least a portion of the input image for useful information. These convolutional layers within the CNN have parameters that are learned so that these filters are adjusted automatically to extract the most useful information for the task at hand. For example, in a general object recognition task it might be most useful to filter information about the shape of an object (e.g., recognizing a car model may be based on a shape of the car). By way of another example, for a bird recognition task it might be more useful to extract information about the color of the bird (e.g., most birds have a similar shape but different colors; thus, color may be more useful to distinguish between birds). In some instances, CNNs adjust automatically to find the best feature for performing a particular task.

In some embodiments, temporal information is included in one or more of the layers to create a CNN which is capable of making better predictions than using spatial information alone. In some embodiments, one or more Long Short Term Memory, or LSTM, layers may be placed between the encoder and decoder layers. In certain embodiments, multiple LSTM layers may be connected together to provide better segmentation predictions. In some instances, portions of the encoder layer may be directly connected to the decoder layer, while in some instances, a LSTM layer may be situated in some or all paths between the encoder layer and the decoder layer. In some instances, any LSTM layer may propagate information forwards or backwards to any other layer in the CNN.

In one embodiment, the one or more LSTM layers comprise one or more encoder LSTMs and one or more decoder LSTMs. Each encoder LSTM can be connected to a subsequent encoder LSTM and/or a decoder LSTM. The first encoder LSTM receives its input from the encoder layer. Each decoder LSTM can also be connected to each other, with the output of the final decoder LSTM being connected to the decoder layer. In such an architecture, output of the decoder layer may be predictive, for example, that each output frame of the decoder layer corresponds to a segmented image which occurs chronologically after the last input image into the encoder layer. Such a configuration may be referred to as a predictive CNN. By way of an example, and without limitation, a predictive CNN may be utilized to receive a sequence of images representing movement of an object, such as a car, and predict a future motion of the car based on the operations described herein.

Exemplary Training of the Convolutional Neural Network (CNN)

To produce a valid output, a CNN must first learn a set of parameters, or be "trained." Training is accomplished by inputting a dataset into the CNN, the dataset being associated with expected output values. These expected output values may generally be referred to as "ground truth." For example, a ground truth may include an identification of specific objects in an image, as well as a semantic classification or label of the object (e.g., identifying and labeling an object as a car or a building). The accuracy of a CNN may be based on the amount of data provided in the training set. As such, an appropriate dataset to train a CNN to output segmented images would include a sequence of images having known, or previously determined, segments. In some instances, as described herein, datasets can include one or more images representing real-world scenes and may be annotated by hand or via one or more algorithms to segment, detect, classify, and/or label objects in the dataset. In some instances, a dataset can include synthetic (e.g., computer generated) data that include annotated objects or that has been annotated by a computer algorithm. Training can be performed using offline and/or online data.

Loss functions can be used to adjust internal parameters of the CNN during training. The loss functions are functions of the expected output (or ground truth) values for the dataset and values output by the CNN. Information contained in loss functions can be sent through the CNN as back propagations to adjust internal parameters, thereby tuning the CNN to provide valid outputs. All else being equal, the more data that is used to train a CNN, the more reliable the CNN may be (e.g., in providing accurate segmentations and/or classifications).

One example of such a loss function which can be used to train a CNN to segment images is the softmax function, though any other function of input images with expected, or ground truth, segmented images is contemplated. Other exemplary loss functions include, but are not limited to, support vector machine (SVM) loss, hinge loss, etc.

In some embodiments, ground truth segmented images are provided for every output of the decoder layer. In some instances, it can be better to have ground truth data for every frame in a dataset; however, some datasets may not have ground truth for every frame. Therefore, in other embodiments, it is possible to train the CNN using portions of datasets which only have a partial subset of ground truth segmented images. In one embodiment, in those portions of a ground truth dataset having only one ground truth segmented image, the ground truth segmented image can be associated with the final frame of the decoder layer output.

In another embodiment, the CNN can be trained by providing an image with a ground truth segmented image as the last frame input to the encoder layer such that it is the first output of the decoder layer. In yet another embodiment, one or more ground truth segmented images may correspond to any or all of the inputs and/or outputs to the CNN.

Even where a dataset does not contain ground truth segmented images for every frame, it is still possible to provide the CNN with a training dataset comprising "noisy" ground truth segmented images. In one or more embodiments, it is possible to create a "noisy" ground truth dataset from a single ground truth segmented image from a sequence of images. In some embodiments, this is performed using spatio-temporal superpixels, such as those described in "Unsupervised Spatio-Temporal Segmentation with Sparse Spectral Clustering," by Ghafarianzadeh et al. As an example, the image associated with the ground truth segmentation is first over-segmented. In some examples, that image is selected to be the center image in a sequence of images. Each segment in the over-segmented image is then labeled using corresponding ground truth segment image labels. Using the spatio-temporal superpixel representation, those labels are then propagated, both forward and backward, to some or all other images in the sequence to create "noisy" ground truth segmented images. Because some images in the sequence may contain information not available in the ground truth image, for example due to motion, portions of those images may not contain a propagated label. Any number of the noisy ground truth can then be used to train the CNN. Using the noisy ground truth technique to train the CNN may be faster and provide higher accuracies than other training methods described herein, or available in the prior art.

In some embodiments, the CNN can be trained for object segmentation, for example, by segmenting an input image based on the objects contained therein. However, many other segmentations are contemplated. As another example, the CNN can be trained to find "free spaces," or areas in an image which would provide a suitable path for planning a trajectory for an autonomous vehicle. In such an embodiment, the free spaces defined in the segmented image are then, in turn, used to generate trajectories and provide commands to an autonomous vehicle to follow such a trajectory. Conversely, the CNN can be trained to find occupied spaces, or areas in an image which would not provide a suitable path for planning a trajectory for an autonomous vehicle.

Increasing the Amount of Training Data (Data Augmentation)

As described above, the accuracy of a CNN can be based at least in part on the amount of data provided in the training set, with more data or a higher number of images in the training set often providing more accurate results. Because datasets have a limited number of images, it is possible to increase the amount of data provided to the CNN for training by perturbing the input data from a given training dataset. Various perturbations include mirroring a cropped portion, enlarging the area for cropping by some amount (for example 20%), adding noise to the image, resizing the image to some fixed dimensions (for example 224×224), varying color, brightness, contrast, etc., and varying the locations of the corners of the image. Additionally, by extending the data set through this perturbation method, a smaller training data set can be used, thereby requiring less memory storage space on a computer. More details are provided below with reference to FIGS. 1-8.

Figure 1B:
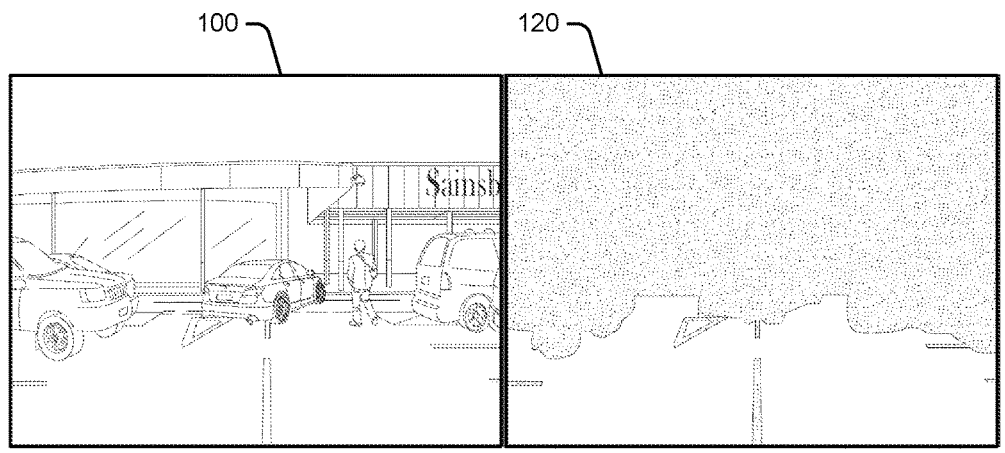

FIGS. 1A and 1B show examples of an image with corresponding output segmented images. Turning first to FIG. 1A, an example input image 100 may correspond to an example object segmented image 110. As above, segmentation can be performed to determine a number of meaningful representations of an image. By segmenting input image 100 based on objects present in the input image 100, the object segmented image 110 can be produced. As illustrated, each different shade of object segmented image 110 corresponds to a different object (e.g., car, building, pedestrian, road marker, etc.). As such, it is possible to determine locations, classifications, and presence or absence of specific objects in an image.

Similarly, FIG. 1B represents another possible segmentation schema. Again, an input image 100 is segmented. Unlike FIG. 1A, the input image 100 may be segmented based on "free space," or potential drivable regions. FIG. 1B illustrates one possible representation of a free space segmented image 120. There, the free space segmented image 120 may provide information (e.g., various shades) for confidence of navigable pathways. As shown, the lighter shade of free space segmented image 120 corresponds to road surfaces which are not obstructed by objects, such as other vehicles or pedestrians. Such a representation is important for developing trajectories for autonomous vehicles so as to avoid collisions.

Figure 2:
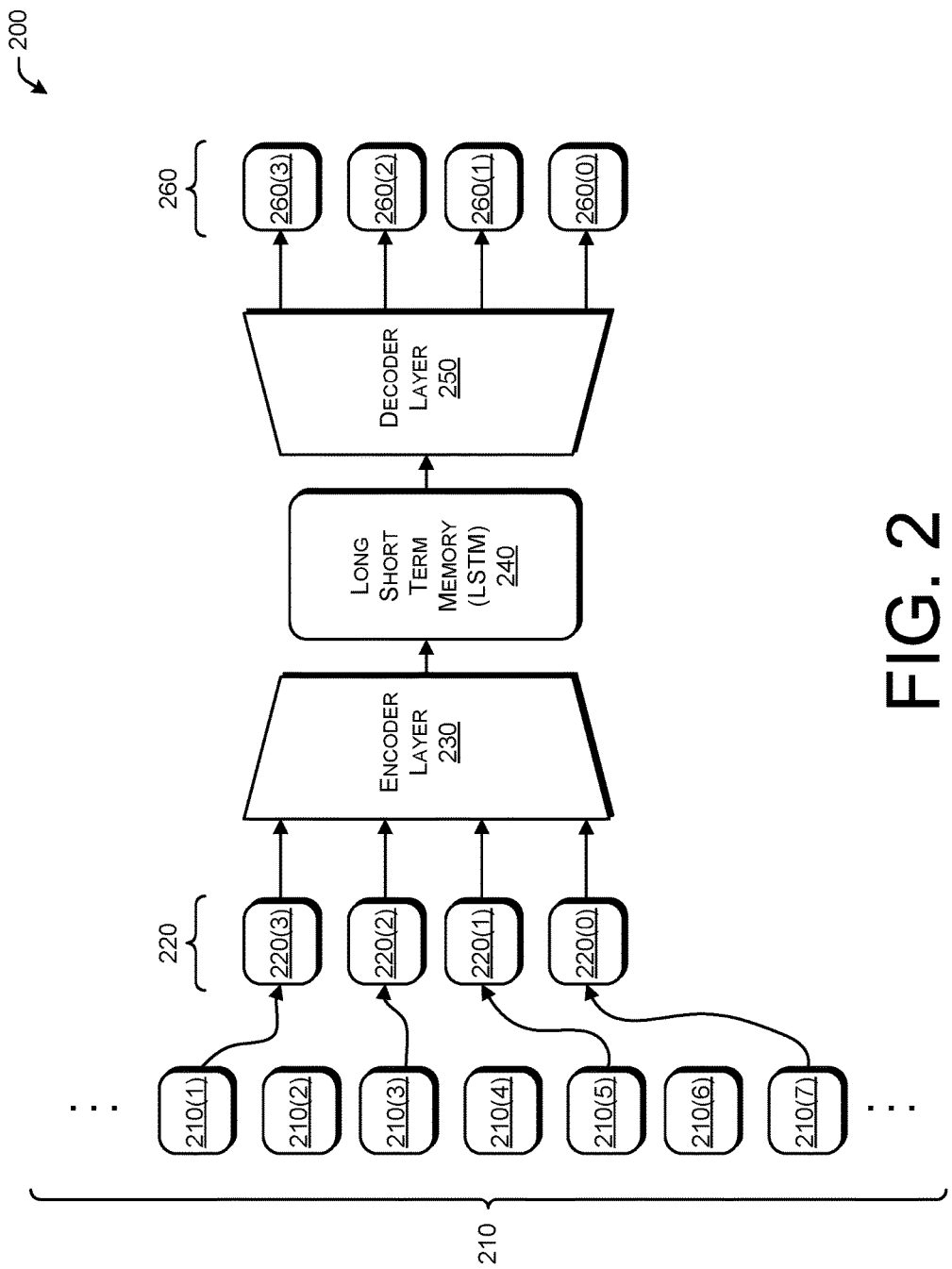
FIG. 2 illustrates an example architecture for a convolutional neural network (CNN) to produce segmented images.

FIG. 2 shows an architecture 200 for one embodiment of a convolutional neural network (CNN) which is able to receive images and output segmented images. In one embodiment, the architecture 200 comprises an encoder layer 230. The encoder layer 230 may comprise a previously trained CNN, such as a Visual Group Geometry (VGG) CNN. The encoder layer 230 can be configured to receive one or more input images 220, which have been labeled in chronological order from time 0 to time 3, with time 3 corresponding to a time after time 0. Though depicted as four input images 220(3), 220(2), 220(1), and 220(0), the encoder layer 230 may receive any number of input images 220, such as input images 210(1) 210(2), 210(3), 210(4), 210(5), 210(6), 210(7), etc. The input images 220 may be selected as a subset of a sequence of images 210. Such a sequence of input images may be generated from any image capture device, such as, for example, a video camera. In some instances, the sequence of input images may be generated as synthetic (e.g., computer generated) data. Although the input images 220 are depicted in FIG. 2 as corresponding to every other frame in the sequence of images 210, the input images 220 may comprise every frame, or every nth frame (where n is a positive integer), of the sequence of images 210. The encoder layer 230 may be configured to receive images which have Red-Green-Blue (RGB), intensity, or RGB-Depth information (e.g., including LIDAR or radar-based information).

After receiving the input images 220, the encoder layer 230 may associate spatial information with each of the input images 220 and may direct an output of the encoder layer 230 to one or more Long Short Term Memory (LSTM) layers 240. Where more than one LSTM layer 240 is used, the output of each may be connected to the subsequent LSTM layer serially. That is, the output of a first LSTM layer may be an input to a second LSTM layer, which in turn, can be connected to another LSTM layer (or a decoder layer, as described herein). The LSTM layers 240, in turn, associate temporal information with the input images 220. That is, the LSTM layers 240 can evaluate temporal features of the input images 220 over many frames. In some instances, the LSTM layers 240 can learn one or more dependencies or associations between data in multiple frames. In some instances, the LSTM layers 240 can store and retrieve this information (e.g., associations between frames, probabilistic inferences, etc.) over any period of time or any number of frames. Output of the one or more LSTM layers 240 can be connected to a decoder layer 250. The decoder layer 250 may perform an inverse operation on the data to produce a series of segmented images 260. Each of the segmented images 260 may correspond to the input images 220 such that the first input image 220 (e.g., image 220(0)), may correspond to the first segmented image 260 (e.g., segmented image 260(0)) output by the decoder layer 250.

Figure 3:
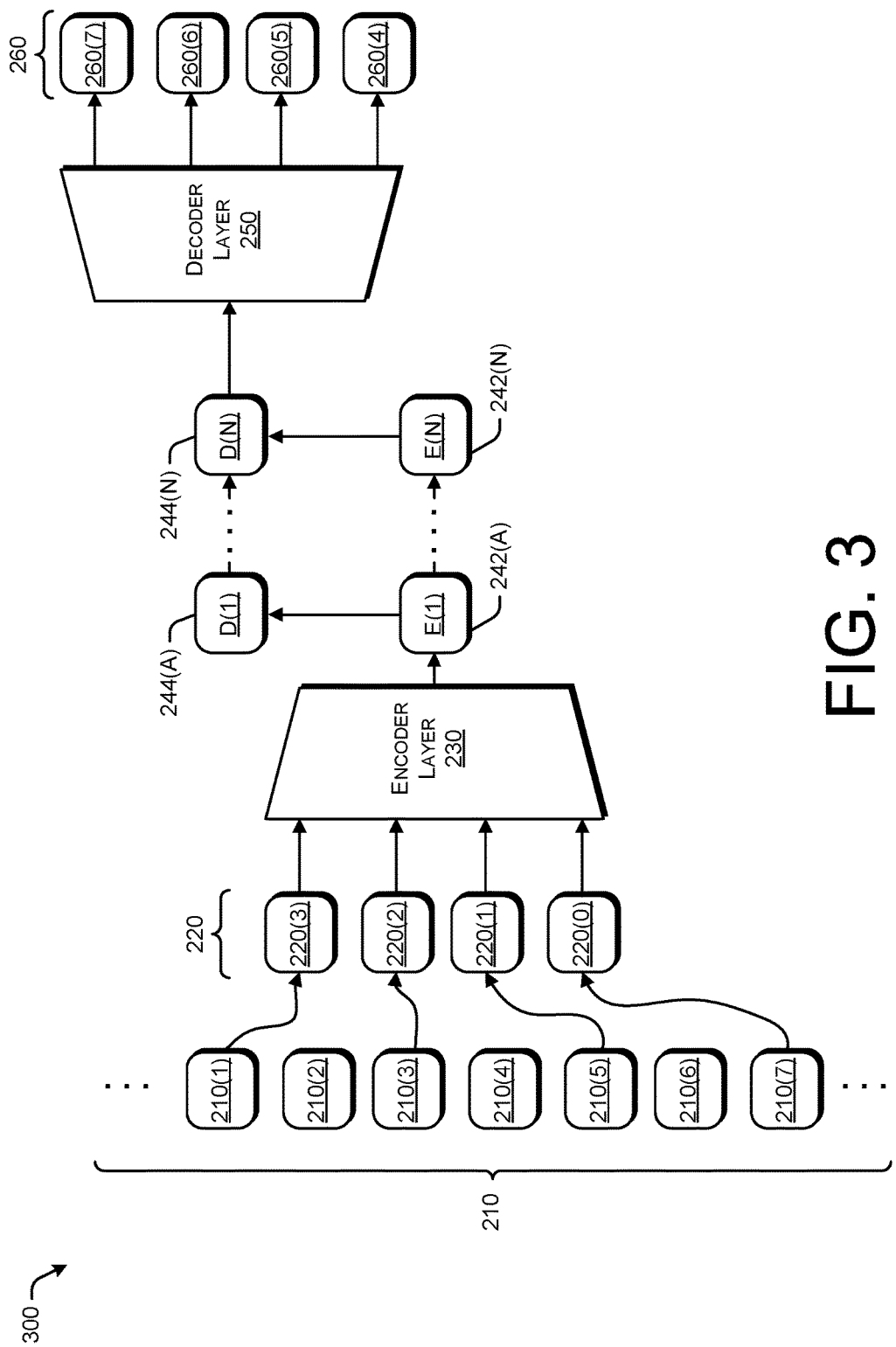
FIG. 3 illustrates another example architecture for a convolutional neural network (CNN) to produce segmented images.

FIG. 3 illustrates an alternative architecture of a convolutional neural network. As opposed to architecture 200 as shown in FIG. 2, the architecture 300 in FIG. 3 may not have one or more serially connected LSTM layers 240. Instead, FIG. 3 depicts an embodiment where the one or more LSTM layers comprise one or more encoder LSTM layers 242(A), . . . , 242(N) and one or more decoder LSTM layers 244(A), . . . , 244(N). In such a configuration, subsequent encoder LSTM layers 242(A), . . . , 242(N) may be connected to one another, such that a hidden output of LSTM layer 242(A) is input to a hidden input of a subsequent LSTM layer, and so on through LSTM layer 242(N). Similarly, subsequent decoder LSTM layers 244(A), . . . , 244(N) may be connected to one another, such that a hidden output of LSTM layer 244(A) is input to a hidden input of a subsequent LSTM layer, and so on through LSTM layer 244(N). Further, in such a configuration, each encoder LSTM layer (e.g., layer 242(A) through layer 242(N)) may be connected to a corresponding decoder LSTM layer (e.g., layer 244(A) through layer 244(N)) such that output of encoder LSTM layer 242(A) may be connected to the input of decoder LSTM layer 244(A), output of encoder LSTM layer 242(B) may be connected to the input of decoder LSTM layer 244(B), and so on. In some instances, an encoder LSTM layer (e.g., 242(A)) can map an input sequence of frames or input data into a fixed length representation.

In such an embodiment as illustrated in FIG. 3, the CNN operates in a predictive manner. As shown, segmented images 260(4), 260(5), 260(6), and 260(7) are enumerated so as indicate that they are chronologically after the input images 220(0), 220(1), 220(2), and 220(3). As such, the output of decoder layer 250 is predictive of future frames. For example, if the input images 220(0), 220(1), 220(2), and 220(3) include a representation of motion of a vehicle, the segmented images 260(4), 260(5), 260(6), and 260(7) may include a prediction of future motion of the vehicle based upon the representations provided in the input images 220. These and other predictions are within the scope of the disclosure, as described herein.

FIGS. 4-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
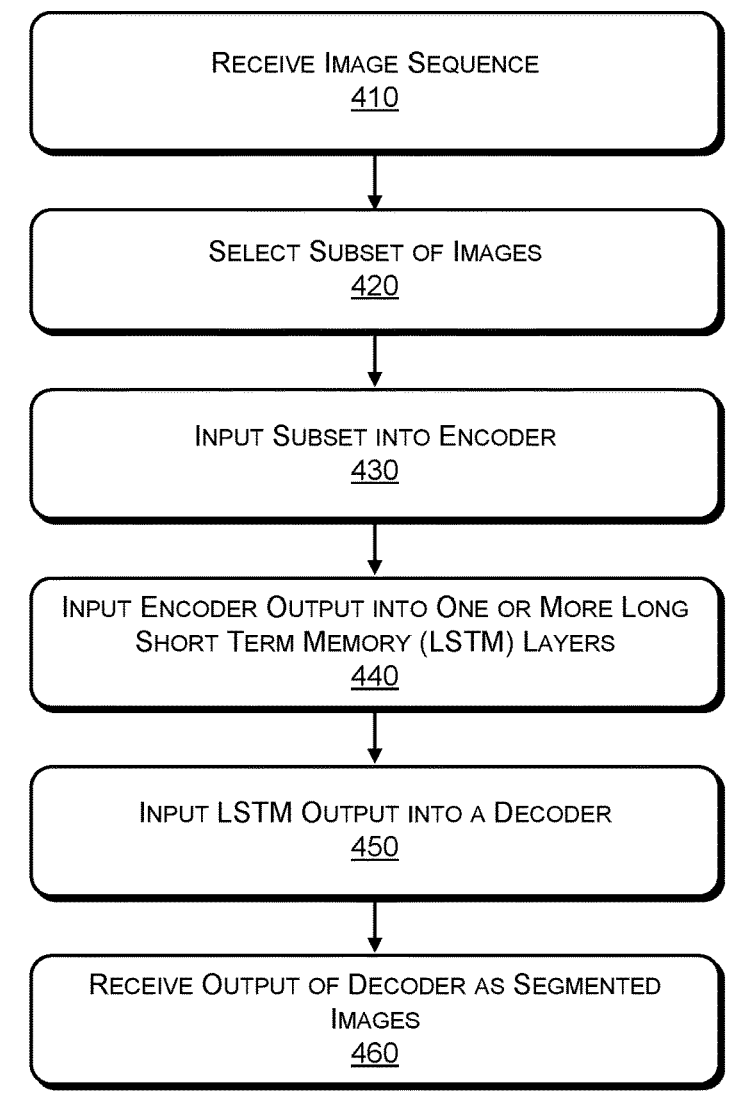
FIG. 4 depicts a process for performing image segmentation using either convolutional neural network (CNN) as illustrated in FIG. 2 or FIG. 3.

FIG. 4 briefly illustrates a process 400 for segmented image prediction using any of the architectures described in detail above. For example, some or all of the process 400 can be performed by one or more components in the architectures 200 and 300, or in the computing system 800, as described below.

At 410, images are received from an image capture device, such as a video camera. In some instances, the images can include any number of channels, such as RGB channels, LIDAR channels, etc. At 420, a subset of those images are selected. The subset can selected such that each image equally spaced from each other in the sequence. As an example, the subset of images comprises every third frame from the sequence of images. At 430, the subset of images is input into an encoder layer. The encoder layer then provides spatial information about the subset as an output. At 440, output from the encoder layer is received at one or more LSTM layers, whether serially connected or as described in FIG. 3. These LSTM layers associate temporal information with the subset of images. At 450, output from the LSTM layers are received by one or more decoder layers. The one or more decoder layers decode the spatial and temporal information to image information. At 460, segmented images are output from the decoder layer. An example of a segmented image that may be output by the operation 460 is illustrated in FIG. 1 as segmented images 110 and 120.

Figure 5:
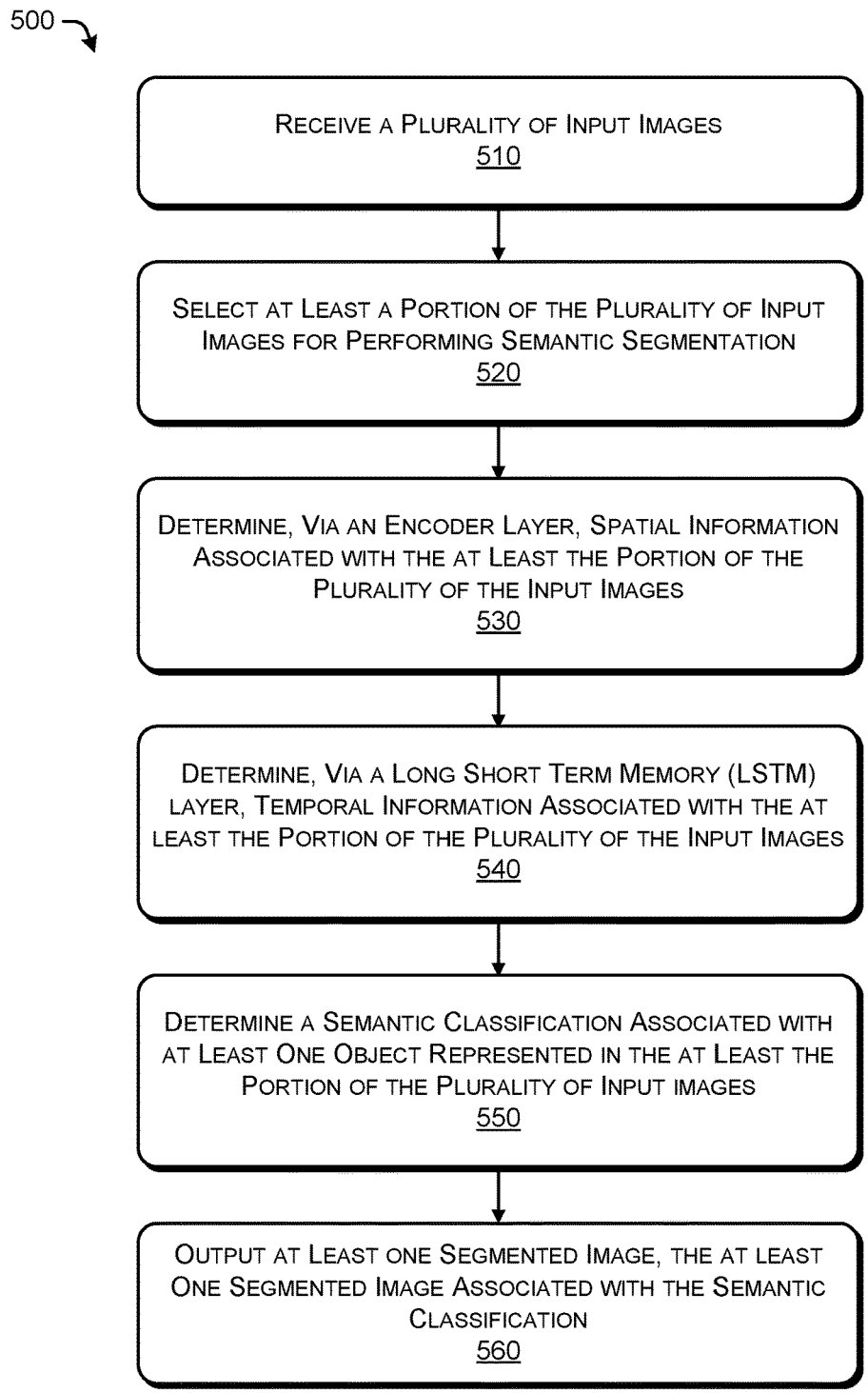
FIG. 5 depicts another exemplary embodiment of a process for performing image segmentation on input images.

FIG. 5 depicts another exemplary embodiment of a process 500 for performing image segmentation on input images. For example, some or all of the process 500 can be performed by one or more components in the architectures 200 and 300, or in the computing system 800, as described below. In some instances, the process 500 is performed by a convolutional neural network including an encoder layer, a long short term memory (LSTM) layer, and/or a decoder layer, as described herein.

At 510, the operation may include receiving a plurality of input images. In some instances, the plurality of input images may be received from one or more image sensors. In some instances, the plurality of input images may include additional sensor data, such as data from one or more LIDAR sensors, radar sensors, etc. In some instances, the plurality of input images may be received from a perception system associated with an autonomous vehicle.

At 520, the operation may include selecting at least a portion of the plurality of input images for performing semantic segmentation. For example, it may be the case that a subset of a stream of image data may be extracted and input to the convolutional neural network for image segmentation. In some instances, to reduce an amount of processing, frames of the plurality of input image may be selected at regular intervals. For example, for video data including 30 frames per second, the operation 520 may include selecting every third, fourth, fifth, etc., frame to reduce an amount of frames to be processed.

At 530, the operation may include determining, via the encoder layer, spatial information associated with the at least the portion of the plurality of the input images. For example, the encoder layer may apply one or more convolutional transformations to the selected data to determine spatial information regarding objects in the selected data. In some instances, the spatial information may be based on color data representing objects in the selected data, etc.

At 540, the operation may include determining, via the LSTM layer, temporal information associated with the at least the portion of the plurality of the input images. For example, the LSTM layer may include any number of LSTM layers, which may propagate temporal information of objects within the selected data forwards or backwards to various LSTM cells to determine temporal information associated with the selected data.

A 550, the operation may include determining a semantic classification associated with at least one object represented in the at least the portion of the plurality of input images, the determining the semantic classification based at least in part on the spatial information and the temporal information. For example, a semantic classification may include identifying a class or type of object, such as a car, pedestrian, building, a road, a tree, etc. It may be understood in the context of this disclosure that the convolutional neural network can be trained using training data (e.g., annotated images identifying objects in the images), which may in turn provide semantic segmentation of objects in the selected images.

At 560, the operation may include outputting at least one segmented image, the at least one segmented image associated with the semantic classification. For example, objects may be segmented (e.g., pixels associated with objects can be identified spatially and labeled with a classification of the object). For example, the at least one segmented image may be segmented to identify free space and occupied space, whereby free space corresponds to an area where an autonomous vehicle may operate. For example, in a scene of a parking lot (e.g., as illustrated in FIG. 1), the free space may indicate areas of the parking lot unoccupied by pedestrians, buildings, and other vehicles. In some instances, the at least one segmented image may be provided to a planner system to generate a trajectory for the autonomous vehicle based on the free space identified in the at least one segmented image. In some embodiments, the semantic classification may correspond to a defective product, for example, whereby the at least one segmented image may be provided to a robot or machine to manipulate the defective product, such as during quality control in a product assembly line.

Exemplary Training

Returning briefly to FIGS. 2 and 3, in order to train the CNN as illustrated in either embodiment, a ground truth segmented image data set can be used. Ideally, every segmented image 260 is associated with a ground truth segmented image. The CNN may then be trained based on the softmax function (or any loss function), incorporating data of the segmented images 260 and the ground truth segmented images which correspond to them. As mentioned above, there may not be enough ground truth segmented data for every segmented image 260 to be associated with a ground truth segmented image. In those situations, the CNN may be trained based on one or more ground truth segmented images. In some embodiments, a single ground truth segmented image is compared with the last output segmented image 260 of the CNN for training (e.g., either segmented image 260(3) in FIG. 2 or segmented image 260(7) of FIG. 3). In another embodiment, the last input image 220 and the first output segmented image 260 (e.g., input image 220(3) and segmented image 260(0) of FIG. 2, respectively) are the image and segmented image associated with the ground truth segmented image.

Figure 6:
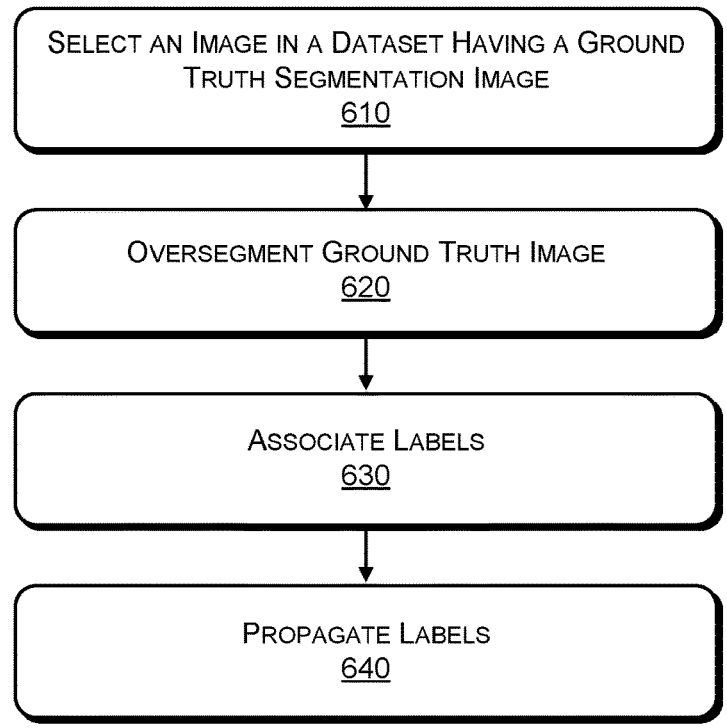
FIG. 6 depicts a process for performing an oversegmentation and propagation to create noisy datasets.

FIG. 6 shows a process 600 for creating a "noisy" ground truth data set from a dataset which has a portion of ground truth segmented images corresponding to images in the training set. In those embodiments, even though only a single ground truth segmented image is provided for training, "noisy" ground truth segmented images can be generated so as to increase the amount of training data. At 610, an image in a dataset corresponding to a ground truth segmented image is selected. In some embodiments, that image is a middle image in a sequence, while in some instances, the ground truth image may be a first image or a last image in a sequence, or any position in a sequence. For example, a dataset of 30 images may be chosen from a larger dataset such that the image having a ground truth segmented image is the 15th image in the sequence. At 620, the image having a corresponding ground truth segmented image is oversegmented to produce an oversegmented image. In some instances, an oversegmented image corresponds to objects being segmented within an image being segmented themselves or fractured into subcomponents. At 630, each segment of the oversegmented image is associated with a label of the ground truth segmented image. In some instances, examples of labels include, but are not limited to representations of objects such as ground, construction, objects, sky, human, vehicle, etc. Of course, any number of labels may be applied to identify segments in the oversegmented image. At 640, the labels are propagated to other images in the training data set using spatio-temporal super pixels to create a "noisy" ground truth dataset. For example, for a ground truth image with an index N, the labels may be propagated forward (e.g., to an image having index $N+M_1$, where $M_1$ is a positive integer), and/or propagated backwards (e.g., to an image having index $N-M_2$, where $M_2$ is a positive integer). For a particular image (e.g., image(N)), propagating labels may include identifying similar features in related images (e.g., image($N+M_1$) or image($N-M_2$)) and associating the ground truth label with aspects of the images. In some instances, for one or more pixels or regions in a related image that are not present in the ground truth annotations (or that emerge or disappear in the related images), a void label can be applied. The noisy ground truth dataset can then be used to train the CNN.

Figure 7:
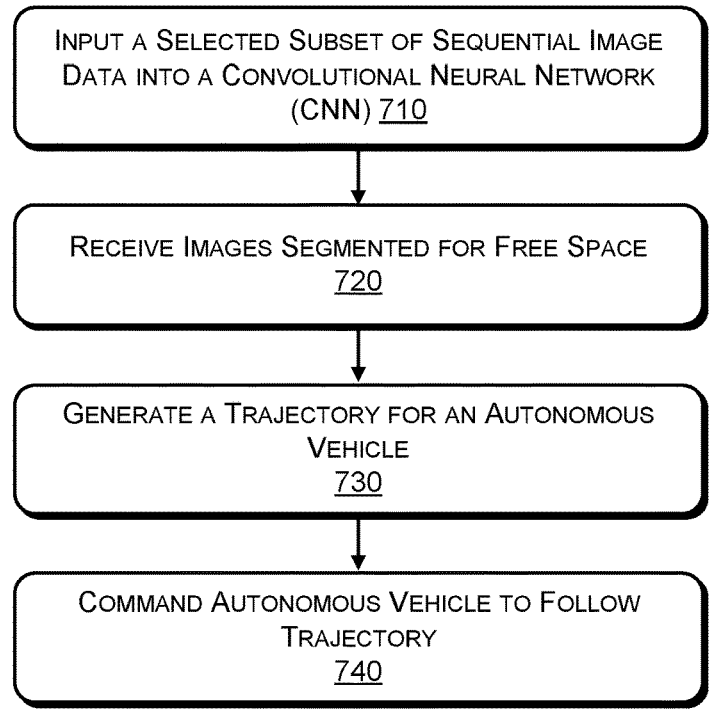
FIG. 7 depicts a process for using either convolutional neural network (CNN) as illustrated in FIG. 2 or FIG. 3 to control an autonomous vehicle.

FIG. 7 illustrates an exemplary process 700 to control an autonomous vehicle based at least in part on a convolutional neural network (CNN) as described in any embodiment above. At 710, a subset of images from a sequence of images is input into the CNN trained to segment based on free space (e.g., drivable or navigable space) in the input image. As an example, the sequence of images may be generated from an image capture system (e.g., a perception system) onboard an autonomous vehicle. In some instances, the image capture system may include any number of sensors, including but not limited to image sensors, LIDAR, radar, etc. At 720, the subset of images is segmented to create a set of free space segmented images. At 730, the free space segmented images are input into a planner system, to generate a trajectory. In some instances, the planner system may be incorporated into a computing system to receive free space segmented images and to generate a trajectory based at least in part on the free space segmented image. At 740, a sequence of commands is generated to control an autonomous vehicle to drive along the trajectory generated in 730. In some instances, the trajectory generated in operation 730 may constrain the operation of the autonomous vehicle to operate within the free space segmented in the operation 720. Further, the commands generated in the operation 740 can be relayed to a controller onboard an autonomous vehicle to control the autonomous vehicle to drive the trajectory. Although discussed in the context of an autonomous vehicle, the process 700, and the techniques and systems described herein, can be applied to a variety systems utilizing machine vision.

Exemplary Computerized System

Figure 8:
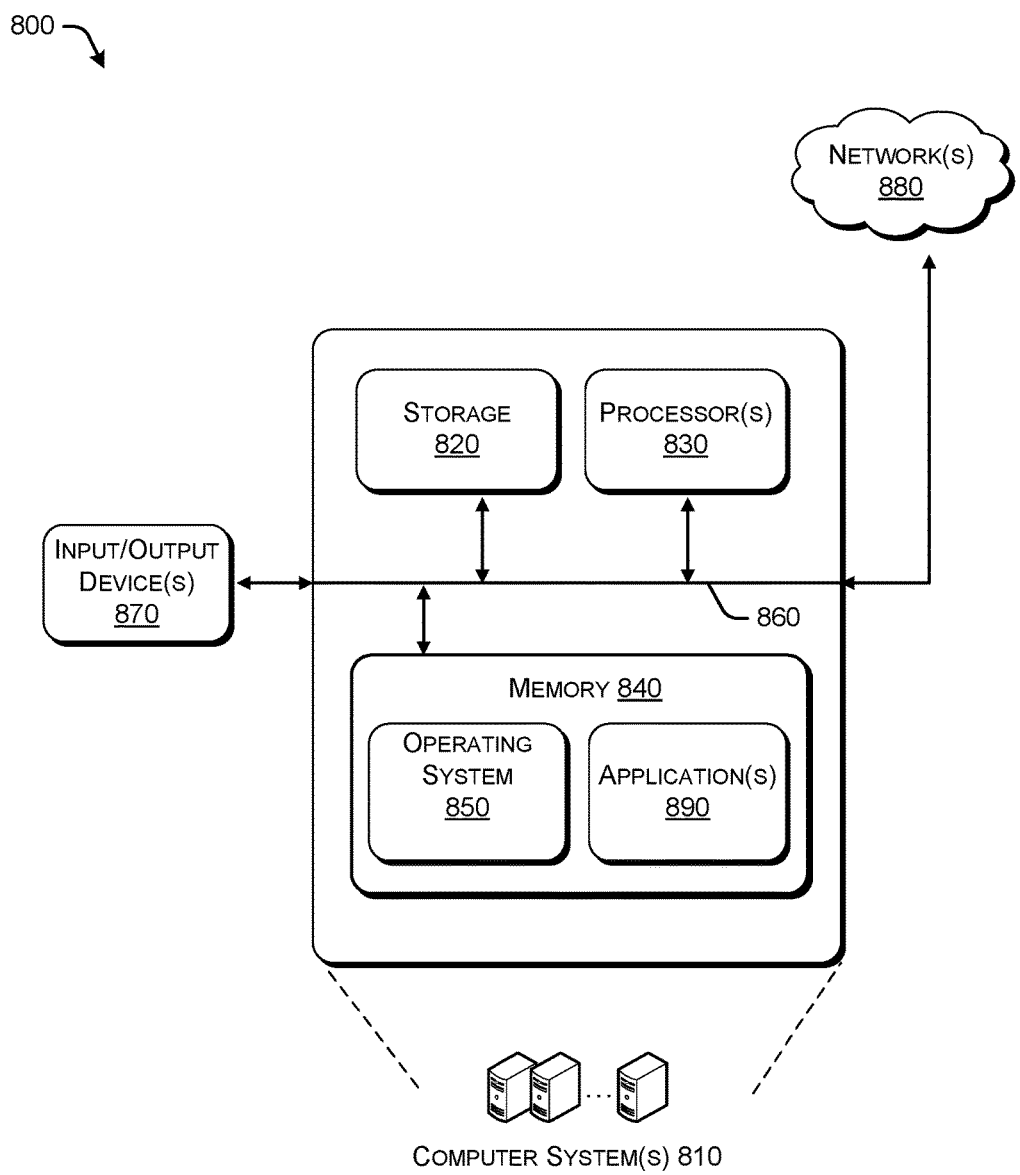
FIG. 8 depicts an example block diagram for a computer system implementing the techniques described herein.

Turning briefly to FIG. 8, a computerized system 800 is depicted as an example computerized system on which the disclosures may be implemented in whole or in part. The computerized system 800 depicts a computer system 810 that comprises a storage 820, one or more processor(s) 830, a memory 840, and an operating system 850. The storage 820, the processor(s) 830, the memory 840, and the operating system 850 may be communicatively coupled over a communication infrastructure 860. Optionally, the computer system 810 may interact with a user, or environment, via input/output (I/O) device(s) 870, as well as one or more other computing devices over a network 880, via the communication infrastructure 850. The operating system 850 may interact with other components to control one or more applications 890.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on-premise virtual systems, or hosted-private instances. Additionally, various aspects of the methods described herein may be combined or merged into other functions.

An exemplary computerized system for implementing the systems and methods described herein is illustrated in FIG. 8. A processor or computer system can be configured to particularly perform some or all of the methods described herein. In some embodiments, the methods can be partially or fully automated by one or more computers or processors. The systems and methods described herein may be implemented using a combination of any of hardware, firmware and/or software. The present systems and methods described herein (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein may be directed toward one or more computer systems capable of carrying out the functionality described herein. Example computing devices may be, but are not limited to, a personal computer (PC) system running any operating system such as, but not limited to, OS X™, iOS™, Linux™, Android™, and Microsoft™ Windows™ However, the systems and methods described herein may not be limited to these platforms. Instead, the systems and methods described herein may be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disc drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store may be a database server, such as Microsoft SQL Server™, Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc. can be stored in tables in the RDBMS. The tables can have predefined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which may allow software and data to be transferred from the removable storage unit to computer system.

The computing device may also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device may also include output devices, such as but not limited to, a display, and a display interface. The computing device may include input/output (I/O) devices such as but not limited to a communications interface, cable and communications path, etc. These devices may include, but are not limited to, a network interface card, and modems. Communications interface(s) may allow software and data to be transferred between a computer system and one or more external devices.

In one or more embodiments, the computing device may be operatively coupled to an automotive system. Such automotive system may be either manually operated, semi-autonomous, or fully autonomous. In such an embodiment, input and output devices may include one or more image capture devices, controllers, microcontrollers, and/or other processors to control automotive functions such as, but not limited to, acceleration, braking, and steering. Further, communication infrastructure in such embodiments may also include a Controller Area Network (CAN) bus.

In one or more embodiments, the computing device may be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and may be applicable to any application utilizing machine vision.

In one or more embodiments, the present embodiments can be practiced in the environment of a computer network or networks. The network can include a private network, or a public network (for example the Internet, as described below), or a combination of both. The network may include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C#, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure may be practiced with other computer system configurations, including hand-held devices, microprocessor systems, microprocessor-based or programmable consumer electronics, minicomputers, mainframe computers, etc. The systems and methods described herein may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The systems and methods described herein may be directed to such computer program products.

References to "one embodiment," "an embodiment," "example embodiment," "various embodiments," etc., may indicate that the embodiment(s) of the present disclosure may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. As non-limiting examples, "processor" may be a Central Processing Unit (CPU) or a Graphics Processing Unit (GPU). A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as the system may embody one or more methods and the methods may be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. An example system comprises:
one or more processors; and
one or more computer readable storage media communicatively coupled to the one or more processors and storing instructions that are executable by the one or more processors to:
  receive a plurality of images from an image capture device;
  transmit the plurality of images into a convolutional neural network; and
  generate a plurality of output images, an output image of the plurality of output images including segmentation information,
  wherein the convolutional neural network comprises:
    one or more encoder layers configured to receive, as a plurality of input images, at least a portion of the plurality of images and configured to output an encoded output,
    one or more long short term memory (LSTM) layers, the one or more LSTM layers configured to receive the encoded output and configured to output an LSTM output, and
    one or more decoder layers configured to receive the LSTM output and configured to output the plurality of output images.

B. The system of example A, wherein the segmentation information is associated with a representation of free space in the output image, and
wherein the instructions are further executable by the one or more processors to transmit the output image to a planner system as an input to generate a trajectory for an autonomous vehicle to navigate within at least a portion of the free space associated with the output image.

C. The system of examples A or B, wherein the one or more LSTM layers comprise at least a first LSTM layer and a second LSTM layer, the first LSTM layer configured to receive as first input the encoded output from the one or more encoder layers and configured to output a first LSTM output to the second LSTM layer, and the second LSTM layer configured to receive as second input the first LSTM output from the first LSTM layer and configured to output the LSTM output to at least one of a third LSTM layer or to the one or more decoder layers.

D. The system of any one of example A through example C, wherein the instructions are further executable by the one or more processors to:

determine, via the one or more encoder layers, spatial information associated with the plurality of input images;

determine, via the one or more LSTM layers, temporal information associated with the plurality of input images; and associate, via the one or more decoder layers, the spatial information with the temporal information to generate the plurality of output images.

E. The system of any one of example A through example C, wherein the instructions are further executable by the one or more processors to generate semantic information associated with the segmentation information, the semantic information semantically classifying at least a portion of pixels in the output image.

F. The system of any one of example A through example C, wherein the plurality of output images includes at least one prediction of future motion of at least one object associated with the plurality of input images.

G. The system of any one of example A through example C, wherein the instructions are further executable by the one or more processors to:

receive a training data set, a first image of the training data set including ground truth information, the ground truth information including at least one label associated with an object represented in the first image;

propagate the at least one label to at least a second image of the training data set to generate a noisy training data set including the first image and the second image, the second image not including the ground truth information; and train the convolutional neural network based at least in part on the noisy training data set.

H. An example method for performing semantic segmentation in a convolutional neural network including one or more encoder layers, one or more long short term memory (LSTM) layers, and one or more decoder layers, the method comprising:

receiving a plurality of input images;

selecting a subset of the plurality of the input images for the semantic segmentation;

determining, via the one or more encoder layers, spatial information associated with the subset of the plurality of the input images;

determining, via the one or more LSTM layers, temporal information associated with the subset of the plurality of the input images;

determining a semantic classification associated with at least one object represented in the subset of the plurality of input images based at least in part on the spatial information and the temporal information; and outputting at least one segmented image, the at least one segmented image associated with the semantic classification.

I. The method of example H, further comprising providing the at least one segmented image to a planner system for generating a trajectory associated with an autonomous vehicle.

J. The method of example H or example I, wherein the one or more LSTM layers include a plurality of LSTM layers, wherein an output of a first LSTM layer of the plurality of LSTM layers is provided as input to a second LSTM layer of the plurality of LSTM layers.

K. The method of any one of example H through example J, further comprising:

determining a predictive output based on the subset of the plurality of the input images; and outputting a plurality of segmented images, the plurality of segmented images including the predictive output representing at least one prediction of future motion of an object represented in the subset of the plurality of the input images.

L. The method of any one of example H through example J, further comprising:

spatially segmenting an image of the subset of the plurality of the input images to identify free space represented in the image; and generating a trajectory for an autonomous vehicle based at least in part on the free space.

M. The method of any one of example H through example J, further comprising:

receiving, at the one or more decoder layers, an output from the one or more LSTM layers; and generating, via the one or more decoder layers, the at least one segmented image based at least in part on the output from the one or more LSTM layers.

N. The method of any one of example H through example J, further comprising training the convolutional neural network using noisy training data, wherein at least a portion of first ground truth information associated with a first image of the noisy training data is derived from a second image of the noisy training data associated with second ground truth information.

O. A system comprises:

one or more processors; and one or more computer readable storage media communicatively coupled to the one or more processors and storing instructions that are executable by the one or more processors to:

receive a plurality of input images;

select a subset of the plurality of the input images for semantic segmentation;

determine, via one or more encoder layers, spatial information associated with the subset of the plurality of the input images;

determine, via one or more long short term memory (LSTM) layers, temporal information associated with the subset of the plurality of the input images;

determine a semantic classification associated with at least one object represented in the subset of the plurality of input images based at least in part on the spatial information and the temporal information; and output at least one segmented image, the at least one segmented image associated with the semantic classification.

P. The system of example O, wherein the instructions are further executable by the one or more processors to provide the at least one segmented image to a planner system for generating a trajectory associated with an autonomous vehicle.

Q. The system of example O or example P, wherein the one or more LSTM layers includes a plurality of LSTM layers, wherein an output of a first LSTM layer of the plurality of LSTM layers is provided as input to a second LSTM layer of the plurality of LSTM layers.

R. The system of any one of example O through example Q, wherein the one or more LSTM layers includes a plurality of encoder LSTM layers and a plurality of decoder LSTM layers, wherein a first encoder LSTM layer of the plurality of encoder LSTM layers is operatively coupled to a corresponding first decoder of the plurality of decoder LSTM layers, and the first encoder LSTM layer is operatively coupled to a subsequent encoder LSTM layer of the plurality of encoder LSTM layers.

S. The system of any one of example O through example Q, wherein the instructions are further executable by the one or more processors to:
determine a predictive output based on the subset of the plurality of the input images; and
output a plurality of segmented images, the plurality of segmented images including the predictive output representing at least one prediction of future motion of an object represented in the subset of the plurality of the input images.

T. The system of any one of example O through example Q, wherein the instructions are further executable by the one or more processors to:
spatially segment an image of the subset of the plurality of the input images to identify free space represented in the image; and
generate a trajectory for an autonomous vehicle based at least in part on the free space.

U. The system of any one of example O through example Q, wherein the instructions are further executable by the one or more processors to:
receive, at one or more decoder layers, an output from the one or more LSTM layers; and
generate, via the one or more decoder layers, the at least one segmented image based at least in part on the output from the one or more LSTM layers.

What is claimed is:

1. A system comprising:
one or more processors; and
one or more computer readable storage media communicatively coupled to the one or more processors and storing instructions that are executable by the one or more processors to:
receive a plurality of images from an image capture device;
select a subset of the plurality of images, the subset of the plurality of images comprising at least a first image associated with a first time and a second image associated with a second time after the first time, wherein the subset of the plurality of images comprises fewer images than the plurality of images;
transmit the subset of the plurality of images into a convolutional neural network; and
generate a plurality of output images comprising at least one predictive segmented image, wherein the at least one predictive segmented image of the plurality of output images is associated with a third time after the second time and comprises predictive segmentation information,
wherein the convolutional neural network comprises:
one or more encoder layers configured to receive, as a plurality of input images, the subset of the plurality of images and configured to output an encoded output,
one or more long short term memory (LSTM) layers, the one or more LSTM layers configured to receive the encoded output and configured to output an LSTM output, and
one or more decoder layers configured to receive the LSTM output and configured to output the plurality of output images.

2. The system of claim 1, wherein the predictive segmentation information is associated with a representation of free space in the output image, and
wherein the instructions are further executable by the one or more processors to transmit the at least one predictive segmented image to a planner system as an input to generate a trajectory for a fully autonomous vehicle to navigate within at least a portion of the free space associated with the at least one predictive segmented image.

3. The system of claim 1, wherein the one or more LSTM layers comprise at least a first LSTM layer and a second LSTM layer,
the first LSTM layer configured to receive as first input the encoded output from the one or more encoder layers and configured to output a first LSTM output to the second LSTM layer, and
the second LSTM layer configured to receive as second input the first LSTM output from the first LSTM layer and configured to output the LSTM output to at least one of a third LSTM layer or to the one or more decoder layers.

4. The system of claim 1, wherein the instructions are further executable by the one or more processors to:
determine, via the one or more encoder layers, spatial information associated with the plurality of input images;
determine, via the one or more LSTM layers, temporal information associated with the plurality of input images; and
associate, via the one or more decoder layers, the spatial information with the temporal information to generate the plurality of output images.

5. The system of claim 1, wherein the instructions are further executable by the one or more processors to generate semantic information associated with the predictive segmentation information, the semantic information semantically classifying at least a portion of pixels in the at least one predictive segmented image.

6. The system of claim 1,
wherein the first image of the subset of the plurality of images corresponds to a first acquired image of the plurality of images and a last image of the subset of the plurality of images comprises a most recently captured image of the plurality of images, and
wherein the plurality of output images includes at least one prediction of future motion of at least one object associated with the plurality of input images.

7. The system of claim 1, wherein the instructions are further executable by the one or more processors to:
receive a training data set, a first training image of the training data set including ground truth information, the ground truth information including at least one label associated with an object represented in the first image;
propagate the at least one label to at least a second training image of the training data set to generate a noisy training data set including the first training image and the second training image, the second training image not including the ground truth information; and train the convolutional neural network based at least in part on the noisy training data set.

8. A method for performing semantic segmentation in a convolutional neural network including one or more encoder layers, one or more long short term memory (LSTM) layers, and one or more decoder layers, the method comprising:
receiving a plurality of input images;
selecting a subset of the plurality of the input images for the semantic segmentation, the subset of the plurality of the input images comprising at least a first image associated with a first time and a second image associated with a second time after the first time, wherein the subset of the plurality of the input images comprises fewer images than the plurality of input images;
determining, via the one or more encoder layers, spatial information associated with the subset of the plurality of the input images;
determining, via the one or more LSTM layers, temporal information associated with the subset of the plurality of the input images;
determining a semantic classification associated with at least one object represented in the subset of the plurality of input images based at least in part on the spatial information and the temporal information; and
outputting a plurality of output images comprising at least one predictive segmented image, wherein the least one predictive segmented image is associated with a third time after the second time and comprises the semantic classification.

9. The method of claim 8,
wherein selecting the subset of the plurality of the input images comprises selecting images from the plurality of the input images such that the subset of the plurality of the input images are equally spaced in time; and
the method further comprising providing the predictive segmented image to a planner system for generating a trajectory associated with an autonomous vehicle, the trajectory comprising one or more of avoiding an obstacle or staying on a path.

10. The method of claim 8, wherein the one or more LSTM layers include a plurality of LSTM layers, wherein an output of a first LSTM layer of the plurality of LSTM layers is provided as input to a second LSTM layer of the plurality of LSTM layers.

11. The method of claim 8, further comprising:
determining the predictive segmented image based on the subset of the plurality of the input images; and
outputting a plurality of segmented images, wherein the predictive segmented image is one of the plurality of segmented images.

12. The method of claim 8, further comprising:
spatially segmenting an image of the subset of the plurality of the input images to identify free space represented in the image; and
generating a trajectory for an autonomous vehicle based at least in part on the free space.

13. The method of claim 8, further comprising:
receiving, at the one or more decoder layers, an output from the one or more LSTM layers; and
generating, via the one or more decoder layers, the predictive segmented image based at least in part on the output from the one or more LSTM layers.

14. The method of claim 8, further comprising training the convolutional neural network using noisy training data, wherein at least a portion of first ground truth information associated with a first training image of the noisy training data is derived from a second training image of the noisy training data associated with second ground truth information.

15. A non-transitory computer readable storage media storing instructions that, when executed, cause one or more processors to perform operations comprising:
receiving a plurality of input images;
selecting a subset of the plurality of the input images for semantic segmentation, the subset of the plurality of the input images comprising at least a first image associated with a first time and a second image associated with a second time after the first time, wherein the subset of the plurality of the input images comprise fewer images that the plurality of input images;
determining, via one or more encoder layers, spatial information associated with the subset of the plurality of the input images;
determining, via one or more long short term memory (LSTM) layers, temporal information associated with the subset of the plurality of the input images;
determining a semantic classification associated with at least one object represented in the subset of the plurality of input images based at least in part on the spatial information and the temporal information; and
outputting a plurality of output images comprising at least one predictive segmented image, wherein the at least one predictive segmented image is associated with a third time after the second time and comprises the semantic classification.

16. The non-transitory computer readable storage media of claim 15, the operations further comprising providing the predictive segmented image to a planner system for generating a trajectory associated with an autonomous vehicle.

17. The non-transitory computer readable storage media of claim 15, wherein the one or more LSTM layers includes a plurality of LSTM layers, and wherein an output of a first LSTM layer of the plurality of LSTM layers is provided as input to a second LSTM layer of the plurality of LSTM layers.

18. The non-transitory computer readable storage media of claim 15, wherein the one or more LSTM layers includes a plurality of encoder LSTM layers and a plurality of decoder LSTM layers, wherein a first encoder LSTM layer of the plurality of encoder LSTM layers is operatively coupled to a corresponding first decoder of the plurality of decoder LSTM layers, and wherein the first encoder LSTM layer is operatively coupled to a subsequent encoder LSTM layer of the plurality of encoder LSTM layers.

19. The non-transitory computer readable storage media of claim 15, the operations further comprising:
determining the predictive segmented image based on the subset of the plurality of the input images.

20. The non-transitory computer readable storage media of claim 15, the operations further comprising:
spatially segmenting an image of the subset of the plurality of the input images to identify free space represented in the image; and
generating a trajectory for a fully autonomous vehicle based at least in part on the free space.

21. The non-transitory computer readable storage media of claim 15, the operations further comprising:
receiving, at one or more decoder layers, an output from the one or more LSTM layers; and
generating, via the one or more decoder layers, the predictive segmented image based at least in part on the output from the one or more LSTM layers.

* * * * *